United States Patent [19]

Sopha

[11] 4,061,155

[45] Dec. 6, 1977

[54] ELECTROHYDRAULIC CONTROL SYSTEM

[75] Inventor: Klaus Sopha, Stuttgart, Germany

[73] Assignee: Robert Bosch G.m.b.H., Stuttgart, Germany

[21] Appl. No.: 674,739

[22] Filed: Apr. 7, 1976

[30] Foreign Application Priority Data

May 28, 1975 Germany ............................ 2523600

[51] Int. Cl.[2] ............................................... G05D 7/06

[52] U.S. Cl. ........................................ 137/85; 91/433; 137/487; 137/625.62

[58] Field of Search ..................... 91/433; 137/85, 486, 137/487, 625.6, 625.61, 625.62, 625.63, 625.64, 625.65

[56] References Cited

U.S. PATENT DOCUMENTS

| | | | |
|---|---|---|---|
| 2,909,195 | 10/1959 | Keyt | 137/625.63 |
| 2,976,848 | 3/1961 | Place | 137/625.62 X |
| 3,044,480 | 7/1962 | Lee | 137/85 |
| 3,055,389 | 9/1962 | Brunner | 137/487 |
| 3,282,168 | 11/1966 | Hayner et al. | 137/85 X |

*Primary Examiner*—Robert G. Nilson
*Attorney, Agent, or Firm*—Michael J. Striker

[57] ABSTRACT

The system includes a way valve of the type provided with a housing, fluid inflow and consumer ports in the housing, and at least one valve member movable in the valve housing for establishing connections between ports. A positioning arrangement receives an electrical input signal and positions the valve member in dependence thereon. A desired-value selector generates a desired-value signal indicative of the desired volumetric flow rate for the flow of fluid into the fluid inflow port and out one of the consumer ports. Transducers sense the position of the valve member and the pressures at the inflow and consumer ports and generate corresponding electrical feedback signals. A circuit arrangement connected to the desired-value selector and to the transducers compensates for the effect upon such volumetric flow rate of variations in the hydraulic loading of consumers supplied via the way valve by furnishing the aforementioned electrical input signal to the positioning arrangement as a predetermined function of both the desired-value and feedback signals.

3 Claims, 2 Drawing Figures

ELECTROHYDRAULIC CONTROL SYSTEM

BACKGROUND OF THE INVENTION

The invention relates to electrohydraulic control systems of the type comprised of a way valve the valve member of which, usually a sliding spool, can be moved in dependence upon the electrical input signal applied to an electrofluidic transducer used as a pilot stage.

More particularly, the invention relates to such electrohydraulic control systems as are provided with transducers for sensing the position of the sliding spool and the load-dependent pressure at the consumer outlet of the valve, the transducers generating corresponding feedback signals which are then used in the formation of the electrical input signal applied to the pilot-stage electrofluidic transducer.

A known control system of this general type is provided with an electrofluidic transducer as a pilot stage for the way valve and its operation is modified by feedback formation. Specifically, a mechanical extension of the sliding spool of the way valve acts upon a one-armed lever which in turn, through the intermediary of a spring, acts upon the deflection-plate lever of the electrofluidic transducer of the pilot stage. Additionally, pressure gauges are arranged on a two-armed lever so that the load pressures likewise can exert an influence upon the position of the deflection-plate lever of the pilot-stage transducer, specifically through the intermediary of the just-mentioned two-armed lever and a further spring. This load-pressure-dependent feedback is intended to increase the stability of the control system, especially against consumer pressure fluctuations. However, it is extremely difficult, virtually impossible, to achieve a reliable and complete enough load-fluctuation compensation. Additionally, these purely mechanical feedback mechanisms are particularly expensive to build; they necessarily exhibit a sluggish response, and furthermore require special matching of the way valve and the pilot stage to the dimensions and movements performed by the components of the feedback mechanism, or vice versa if the feedback mechanism must be provided for a certain control valve construction, so that in general use cannot be made of widely available ready-made components.

SUMMARY OF THE INVENTION

It is a general object of the invention to devise an electrohydraulic control system of the general type in question which avoids the disadvantages explained above, and which in particular incorporates extremely exact compensation for load pressure fluctuations, so that the overall performance of the control system will be virtually independent of load fluctuations.

These objects, and others which will become more understandable from the description, below, of preferred embodiments, can be achieved, according to one advantageous concept of the invention by providing positioning means operative for receiving an electrical input signal and positioning the valve member in dependence thereon; desired-value selector means for generating a desired-value signal indicative of a desired volumetric flow rate for the flow of fluid into the fluid inflow port and out a consumer port of the way valve of the control system; transducers operative for sensing the position of the valve member and the pressures at the inflow and consumer ports and generating corresponding electrical feedback signals; and circuit means connected to the desired-value selector means and to the transducers and operative for compensating for the effect upon such volumetric flow rate of variations in the hydraulic loading of consumers supplied via the way valve by furnishing said electrical input signal to the positioning means as a predetermined function of both the desired-value signal and the feedback signals.

According to preferred concepts of the invention, illustrated in specific embodiments discussed below, the electrical circuit means which processes the electrical desired-value signal and the electrical feedback signals is designed to take into account with great precision certain mathematical relationships, discussed in detail below, involved in the control of fluid flow in an electrohydraulic control system of the type in question. In particular, certain auxiliary electrical signals are derived from the desired-value signal and from the feedback signals. These auxiliary electrical signals correspond to certain variables which have been shown by mathematical analysis to play an important part in the system instability and undesirable response to load pressure fluctuations. By generating these special auxiliary electrical signals, corresponding mathematically to certain fluid-flow variables which are not directly measurable by simple means, it is possible to continually "get at" crucial information concerning the ongoing performance of the system and thereby more accurately compensate for load pressure fluctuations than was possible with any expedients known in the prior art.

Furthermore, the circuit configurations employed, although they embody control principles not resorted to in the purely mechanical compensation mechanisms of the prior art, are nevertheless actually easier and less expensive to construct and install, because they can be assembled from standard components which are widely available commercially and need not be specially made. Additionally, the circuitry, besides implementing control principles not hitherto resorted to in this general context, by extracting certain auxiliary signals indicative of important fluid flow variables, inherently tends to be less space-consuming than the purely mechanical compensating mechanisms of the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
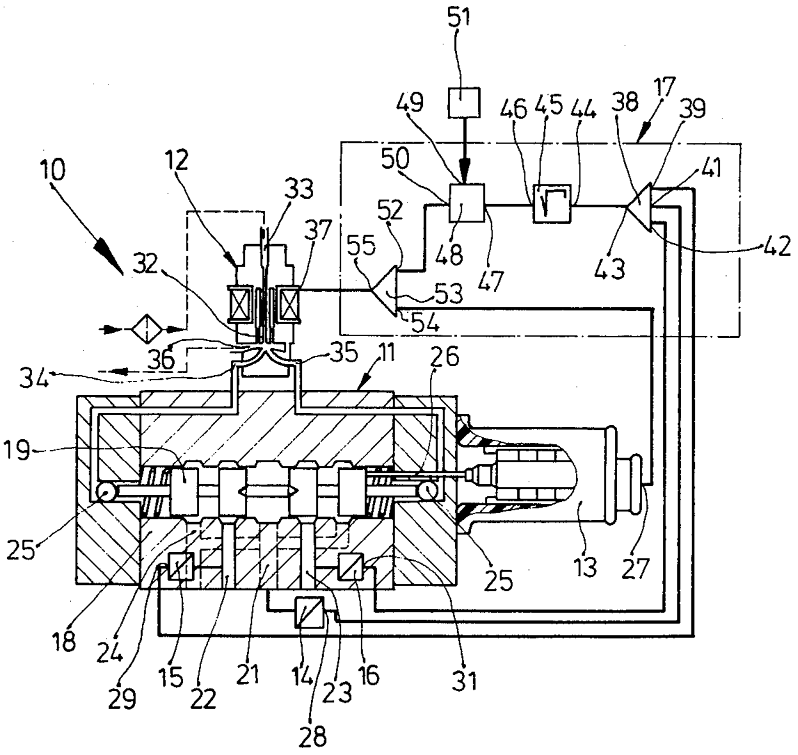
FIG. 1 depicts schematically an electrohydraulic control system, the mechanical components being shown in partial longitudinal section, simplified, and the electrical components being shown in block-diagram form.

FIG. 1 depicts an electrohydraulic control arrangement 10. Control arrangement 10 includes as its main control component a control valve 11, and furthermore includes an electrofluidic (electrohydraulic or electropneumatic) transducer 12 serving as the pilot stage for the control valve 11, the pilot stage and control valve being connected together in conventional servo-valve configuration. An inductively operating first transducer 13 mounted on the control valve 11 forms part of a position-regulating circuit described below. Electrohydraulic second, third and fourth transducers 14, 15, 16 are also provided and feed information into a regulating circuit 17.

Control valve 11 in per se known manner is provided in its main bore with a seal-tightly slidable spool 19 operative for establishing connections between an inflow port 21, two consumer ports 22, 23, and a return-flow port 24. Spool 19 is spring-centered, has positive overlap, is provided with fine-control grooves or notches on its lands, and can be shifted by hydraulic force in either direction out of its illustrated centered position by means of hydraulic fluid acting on balls 25. Spool 19 can assume an infinity of positions in which consumer ports 22, 23 are unblocked to any desired intermediate degree.

An adjusting member 26 connected to spool 19 cooperates with the inductive transducer 13 to cause the latter to generate at its electrical output 27 an electrical signal indicative of the positions of spool 19. The electrohydraulic second transducer 14 is arranged at the inflow port 14 of the valve block, whereas the third and fourth transducers 15, 16 are respectively arranged at the consumer ports 22, 23. Second, third and fourth transducers 14, 15, 16 are provided with respective electrical outputs 28, 29 and 31.

Electrohydraulic transducer 12 is comprised of an electromagnetically deflectable jet nozzle 32 and has a hydraulic input 33, two hydraulic outputs 34, 35 opening onto the balls 25, a return flow conduit 36, and an electrical input 37. Transducer 12 establishes at its hydraulic outlets 34, 35 a pressure difference which corresponds in polarity and magnitude to the polarity and magnitude of the electrical current applied to its electrical input 37.

Regulating circuit 17 includes a first difference amplifier 38 provided with first, second and third inputs 39, 41, 42 respectively connected to the electrical outputs of the third, second and fourth transducers 15, 14, 16. Output 43 of first difference amplifier 38 is connected to the input of a square-root extractor 45. Output 46 of square-root extractor 45 is connected to the first input 47 of a divider 48, the second input 49 of which is connected to the output of a desired-value selector 51. Desired-value selector 51 may for example be essentially comprised of an adjustable voltage divider connected across a voltage source, the wiper of the voltage divider constituting the output of selector 51. Output 50 of divider 48 is connected to the first output 52 of a second difference amplifier 53, the second input 54 of which is connected with the output 27 of inductive first transducer 13. Output 55 of second difference amplifier 55 is connected to the electrical input of electrohydraulic transducer 12.

The operation of the embodiment of FIG. 1 is as follows:

The electrical signal applied to electrical input 37 of electrohydraulic transducer 12 is converted by the latter into a pressure difference at its outlets 34, 35. The pressure difference corresponds in polarity and is proportional in magnitude to the applied electrical signal. This pressure difference is applied via the balls 25 to the opposite ends of spool 19. In response spool 19 moves out of its centered or neutral position, against the force of one or the other of its centering springs, and establishes a connection between inflow port 21 (connected to the outlet of a pump for example) and one of the two consumer ports 22, 23, the extent to which the now unblocked consumer port is unblocked being dependent upon the magnitude of the pressure difference and having any value from fully blocked to fully unblocked. Whereas one of the consumer ports 23, 24 becomes connected to inlet port 21, the other consumer port is unloaded via return-flow port 24.

The distance which spool 19 moves out of its centered or neutral position is proportional to the magnitude of the electrical signal applied to input 37 of transducer 12, and accordingly the flow cross-sectional area of the unblocked portion of the unblocked port is likewise proportional to the magnitude of the electrical signal applied to input 37.

The volumetric flow rate of fluid through the unblocked portion of the unblocked one of the two consumer ports 22, 23, throughout the major portion of the range of intermediate unblocking of the consumer port, is given by the flow equation:

$$Q = c \cdot A \sqrt{2/a} \sqrt{p_1 - p_2}$$

Q represents the volumetric flow rate (expressed in gallons per minute, liters per minute, or the like), c is a constant flow aperture parameter, A is the cross-sectional area of the unblocked portion of the unblocked one of the consumer ports 22, 23, $p_1$ is the pressure in inflow conduit 21, and $p_2$ is the pressure in the unblocked one of the consumer conduits 22, 23.

As the flow equation indicates, if the pressures upstream and downstream of the control edge of that one of the spool lands which is unblocking one of the consumer ports remains constant, i.e., if $p_1 - p_2$ remains constant, then the volumetric flow rate Q is proportional to the unblocked flow cross-sectional area A. However, if the pressure difference $p_1 - p_2$ changes, for example in response to a change of the load applied to the consumers connected to ports 22, 23, there will be a corresponding change in the relationship between Q and A.

In order to make the volumetric flow rate Q independent of such load variations, the pressure $p_1$ in inflow conduit 21 and the pressure $p_2$ in the unblocked one of the consumer conduits 22, 23 are measured, and corresponding measurement signals are fed back into the regulating circuit 17 which then automatically responds by controlling the unblocked area A in such a manner as to exactly compensate for the effect of variations in the pressure difference $p_1 - p_2$. As a result, the control arrangement 10 is capable of load-independent operation, in that the actual volumetric flow rate Q will be directly proportional to the desired-value signal furnished at the output of desired-value selector 51.

To this end, electrical signals indicative of $p_1$ and $p_2$ are fed by transducers 14, 15 or 16 to the inputs of the first difference amplifier 38. The signal at amplifier output 43 corresponds to the pressure difference $p_1 - p_2$. This pressure-difference signal is then applied to square-root extractor 45. The latter generates at its output 46 a signal corresponding in magnitude to the square root of the pressure difference $p_1 - p_2$, multiplied by the factor $c \sqrt{2/a}$; i.e., the signal at output 46 is a feedback signal corresponding in magnitude to $c \sqrt{(2/a)} \sqrt{p_1 - p_2}$. The meaning of this feedback signal can be seen if the flow equation presented above is rewritten as follows:

$$\left[c\sqrt{\frac{2}{a}}\ \sqrt{p_1 - p_2}\right]_{actual} = \frac{Q_{actual}}{A_{actual}}$$

The feedback signal at output 46 is now applied to input 47 of divider 48, causing the magnitude of the desired-value signal applied to divider input 49 to be divided by the magnitude of the feedback signal. The resulting signal at divider output 50 has a magnitude corresponding to the following equation:

$$\frac{Q_{desired}}{\left[c\sqrt{\frac{2}{a}}\ \sqrt{p_1 - p_2}\right]_{actual}} = \frac{Q_{desired} \cdot A_{actual}}{Q_{actual}}$$

If in the above equation the expression on the right is multiplied by $$\frac{A_{desired}}{A_{desired}},$$

that expression becomes $$\frac{Q_{desired} \cdot A_{actual} \cdot A_{desired}}{Q_{actual} \cdot A_{desired}}$$

by resorting to an experimentally determined value K, the expression just presented can be converted into a simpler form as follows:

$$\frac{Q_{desired} \cdot A_{actual} \cdot A_{desired}}{A_{desired} \cdot Q_{actual}} = K \cdot A_{desired}$$

Having made this conversion, K in the above equation can be considered essentially a correction facctor, so that the corresponding signal at divider output 50 can be interpreted as corresponding to $A_{desired}$ multiplied by a correction factor K, or still more simply the signal at divider output 50 can be considered to correspond (with the inclusion of a correction) to $A_{desired}$. It will be noted that the desired-valued quantity — i.e., the quantity selected using desired-value selector 51 — is $Q_{desired}$, and that $A_{desired}$ is a quasi-fictional or at most indirectly selected quantity.

In any event, the signal at divider output 50, considered to represent $A_{desired}$ (with the inclusion of a correction factor), is applied to input 52 of difference amplifier 53, whereas input 54 receives from electrical output 37 of transducer 12 an electrical signal representing $A_{actual}$ (multiplied by a corresponding factor). The signal at difference amplifier output 55 thus represents the difference between $A_{desired}$ and $A_{actual}$ and its application to electrical input 37 of electrohydraulic (pilot) transducer 12 will, in negative-feedback manner, result in automatic shifting of spool 19 to a position causing $A_{actual}$ to become equal to $A_{desired}$.

In this way, it becomes possible, despite the variations in the load pressure in conduit 22 or 23, to maintain proportionality between the actual volumetric flow rate Q and the magnitude (or other characteristic) of the signal furnished by desired-value selector 51. This load-compensated control of the volumetric flow rate takes place in both direction settings of the control valve 11, the first difference amplifier 38 selecting the signal indicative of pressure $p_1$ from the proper one of the transducers 15 and 16.

The incorporation of spool 19 into a position-regulating circuit results in quick-responding, precise and stable behavior of the overall volumetric-flow-rate-selecting control system.

Figure 2:
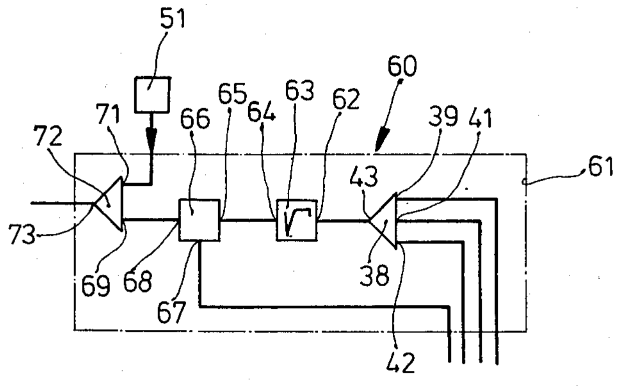
FIG. 2 depicts different circuitry for the control system.

FIG. 2 depicts the different regulating circuitry 61 of a second control arrangement 60 which in other respects is the same as the control arrangement 10 of FIG. 1. Circuit components in FIG. 2 corresponding to those in FIG. 1 are designated by the same reference numerals, even though the configuration of the regulating circuit formed by them is different.

Regulating circuit 61 includes a first difference amplifier 38, the output 43 of which is connected with input 62 of a square-root extractor 63. Output 64 of square-root extractor 63 is connected to the first input 65 of a multiplier 66, the second input 67 of which is connected to output 27 of first transducer 13. Output 68 of multiplier 66 and the output of desired-value selector 51 are connected to the inputs 69, 71 of a second difference amplifier 72, the output 73 of which is connected to input 37 of electrohydraulic transducer 12.

The operation of regulating circuit 61 is as follows:

In FIG. 2 as in FIG. 1, difference amplifier 38 furnishes at its output 43 a signal corresponding to the pressure difference $p_1 - p_2$, and the square-root extractor 63 furnishes at its output 64 a signal whose magnitude corresponds to $\sqrt{p_1 - p_2}$. Multiplier 66 multiplies this square-root signal at its input 65 by the signal at its input 67, the latter signal corresponding to $A_{actual}$; also, multiplier 66 introduces a further constant factor corresponding to $c\sqrt{(2/a)}$. Thus, the signal appearing at multiplier output 68 corresponds in magnitude to $$A_{actual} \cdot \sqrt{p_1 - p_2} \cdot c\sqrt{\frac{2}{a}}$$

The above expression is equivalent to the volumetric flow rate $Q_{actual}$.

The signal appearing at difference-amplifier output 73 accordingly corresponds to the difference between $Q_{desired}$ and $Q_{actual}$. This deviation or error signal is then applied to input 37 of electrohydraulic transducer 12. The error signal will cause the position of spool 19 to change until the difference between $Q_{desired}$ and $Q_{actual}$ becomes substantially zero. In this way, the actual volumetric flow rate will be directly proportional to the desired-value signal set by means of desired-value selector 51.

The embodiments of FIGS. 1 and 2 are merely exemplary. It will be appreciated that the circuit configurations of FIGS. 1 and 2 are quite different; regulating circuit 17 of FIG. 1 operates to reduce to zero the difference between $A_{desired}$ and $A_{actual}$ and thus only indirectly reduces to zero the difference between $Q_{desired}$ and $Q_{actual}$, whereas regulating circuit 61 of FIG. 2 operates directly to reduce to zero the difference between $Q_{desired}$ and $Q_{actual}$. Other transformations of the equations presented above, and of other equations representing the same relationships, will result in other circuit configurations which are presently believed to be within the scope of the invention. Also, different circuit configurations could be utilized even when their design is based upon the same equation transformations used in the design of the circuits of FIGS. 1 and 2.

Furthermore, in the embodiments of FIGS. 1 and 2 the various signals referred to indicate the value of the quantities being represented by means of signal magnitude; in principle, however, it would be possible to utilize the frequencies or other characteristics of such signals to represent the quantities in question.

It will be understood that each of the elements described above, or two or more together, may also find a useful application in other types of circuits and constructions differing from the types described above.

While the invention has been illustrated and described as embodied in an electrohydraulic control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an electrohydraulic control system, in combination, a way valve of the type comprised of a housing, fluid inflow and consumer ports in the housing, and at least one valve member movable in the valve housing for establishing connections between ports; positioning means operative for receiving an electrical input signal and positioning the valve member in dependence thereon; desired-value selector means for generating a desired-value signal indicative of a desired volumetric flow rate for the flow of fluid into the fluid inflow and out the consumer ports; transducers operative for sensing the position of the valve member and the pressures at the inflow and consumer ports and generating corresponding electrical feedback signals; and circuit means connected to the desired-value selector means and to the transducers and operative for compensating for the effect upon said volumetric flow rate of variations in the hydraulic loading of consumers supplied via the way valve by furnishing said electrical input signal to the positioning means as a predetermined function of both desired-value and feedback signals, the circuit means including a first difference amplifier having inputs connected to the outputs of respective ones of the pressure-sensing transducers, a square-root extractor having an input connected to the output of the first difference amplifier, a divider having a first input connected to the output of the square-root extractor and a second input connected to the output of the desired-value selector means, a second difference amplifier having a first input connected to the output of the divider and a second input connected to the output of the one of the transducers which senses the position of the valve member, the output of the second difference amplifier being connected to the input of the positioning means for furnishing said electrical input signal thereto.

2. In an electrohydraulic control system, in combination, a way valve of the type comprised of a housing, fluid inflow and consumer ports in the housing, and at least one valve member movable in the valve housing for establishing connections between ports; positioning means operative for receiving an electrical input signal and positioning the valve member in dependence thereon; desired-value selector means for generating a desired-value signal indicative of a desired volumetric flow rate for the flow of fluid into the fluid inflow and out the consumer ports; transducers operative for sensing the position of the valve member and the pressures at the inflow and consumer ports and generating corresponding electrical feedback signals; and circuit means connected to the desired-value selector means and to the transducers and operative for compensating for the effect upon said volumetric flow rate of variations in the hydraulic loading of consumers supplied via the way valve by furnishing said electrical input signal to the positioning means as a predetermined function of both desired-value and feedback signals, the circuit means including a first difference amplifier having inputs connected to the outputs of respective ones of the pressure-sensing transducers, a square-root extractor having an input connected to the output of the first difference amplifier, a multiplier having a first input connected to the output of the square-root extractor and having a second input connected to the output of the one of the transducers which senses the position of the valve member, and a second difference amplifier having a first input connected to the output of the multiplier and having a second input connected to the output of the desired-value selector means and having an output connected to the input of the positioning means for furnishing said electrical input signal thereto.

3. In an electrohydraulic control system, in combination, a way valve of the type comprised of a housing, a fluid inflow port and at least a first and a second consumer port, and a valve member movable within a first range of positions connecting the fluid inflow port to the first consumer port and a second range of positions connecting the fluid inflow port to the second consumer port; positioning means operative for receiving an electrical input signal and positioning the valve member in dependence thereon; desired-value selector means for generating an electrical desired-value signal indicative of a desired volumetric flow rate for the flow of fluid into the fluid inflow port and out a selected one of the consumer ports; a transducer operative for sensing valve-member position and generating a corresponding electrical valve-member-position feedback signal; an electrohydraulic transducer operative for sensing the pressure in only the inflow port and generating a corresponding electrical inflow-port-pressure feedback signal; an electrohydraulic transducer operative for sensing the pressure in only the first consumer port and generating a corresponding electrical first-consumer-port-pressure feedback signal; an electrohydraulic transducer operative for sensing the pressure in only the second consumer port and generating a corresponding electrical second-consumer-port-pressure feedback signal; and circuit means connected to the desired-value selector means, to the valve-member-position transducer and to the aforementioned three electrohydraulic transducers and operative for compensating for the effect upon said volumetric flow rate of variations in the hydraulic loading of consumers supplied via the way valve by furnishing said electrical input signal to the positioning means as a predetermined function of said desired-value signal and said electrical feedback signals.

* * * * *